Oct. 27, 1931.  G. W. C. WEBB  1,828,795
FORM OF REDUCTION GEAR
Filed Oct. 6, 1928  4 Sheets-Sheet 1

INVENTOR
George William Butler Webb.

Attorney.

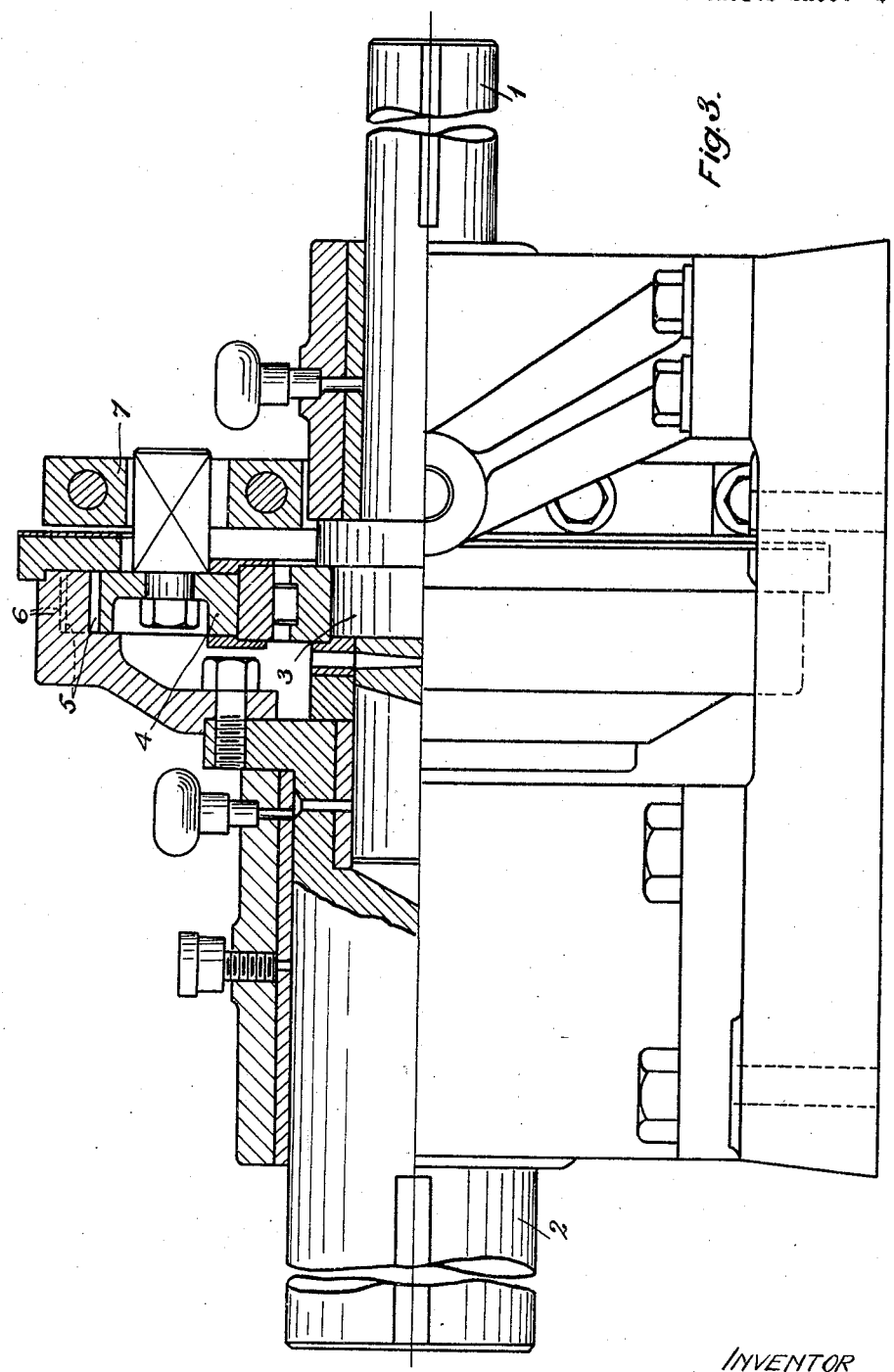

Oct. 27, 1931.　　　G. W. C. WEBB　　　1,828,795
FORM OF REDUCTION GEAR
Filed Oct. 6, 1928　　　4 Sheets-Sheet 3

INVENTOR
George William Cutler Webb.
Arthur J. Stephens
Attorney.

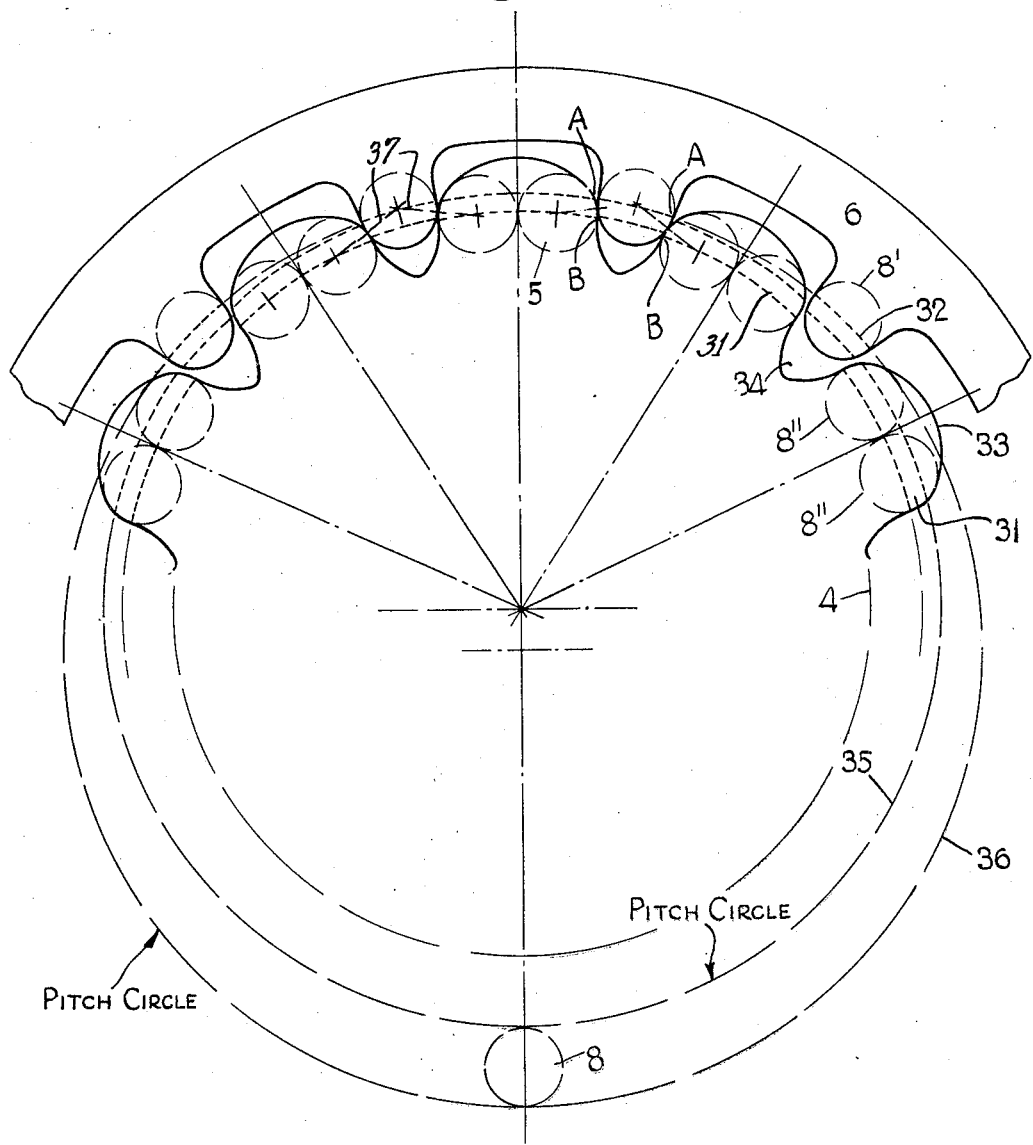

Patented Oct. 27, 1931

1,828,795

UNITED STATES PATENT OFFICE

GEORGE WILLIAM CUTLER WEBB, OF LONDON, ENGLAND, ASSIGNOR OF ONE-HALF TO STANLEY CARLTON SMITH, OF BEDFORDSHIRE, ENGLAND

FORM OF REDUCTION GEAR

Application filed October 6, 1928, Serial No. 310,746, and in Great Britain October 17, 1927.

The present invention relates to improvements in those reduction gears of the type in which a relatively high speed rotating eccentric, integral with the driving member, is adapted to rock a strap mounted thereon, the throw of the said eccentric being transmitted through the strap to gearing adapted to rotate the driven member at reduced speed. The reduced speed is obtained by the engagement of the teeth in the periphery of the strap with a ring of teeth concentric with the axis of rotation of the eccentric. If this concentric ring is fixed, and the strap allowed to rotate on the eccentric, the low speed rotary motion of the strap can be transmitted to the driven shaft by any suitable flexible coupling. Alternatively, if the strap, while being allowed to rock, is prevented from rotation on the eccentric by any suitable flexible coupling attached to a fixed point and the concentric ring is coupled to the driven shaft the reduced speed will be obtained through this concentric toothed member. The reduced speed in each case depending on the relative number of teeth in the strap and the other member.

According to the present invention I provide gearing of the character described in which the teeth on at least one member have a portion of their profile substantially corresponding to a hypocycloidal curve generated by a point in the circumstance of a rolling circle approximately equal in diameter to the throw of the eccentric, which should for efficient working be equal to the difference in pitch circle diameters of the strap, and the member with which it gears for the purpose of obtaining the reduced speed. While to ensure the most suitable engagement of teeth I arrange for the teeth of one member preferably the inner member to be substantially twice the thickness of the teeth in the other member preferably the outer member.

My invention is illustrated by way of example in the accompanying drawings, in which—

Figure 3 shows an elevation partially in section of an alternative form of gearing.

Figure 6 is an enlarged diagram showing the development of gear teeth according to this invention.

Figure 1:
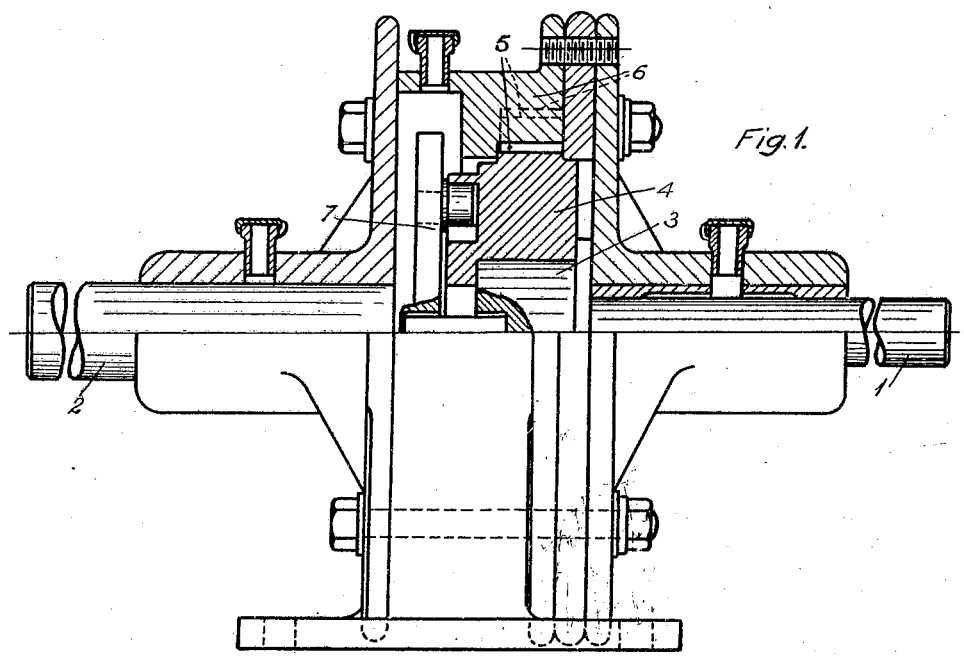
Figure 1 shows an elevation partially in section of a reduction gearing according to this invention.
Figure 2:
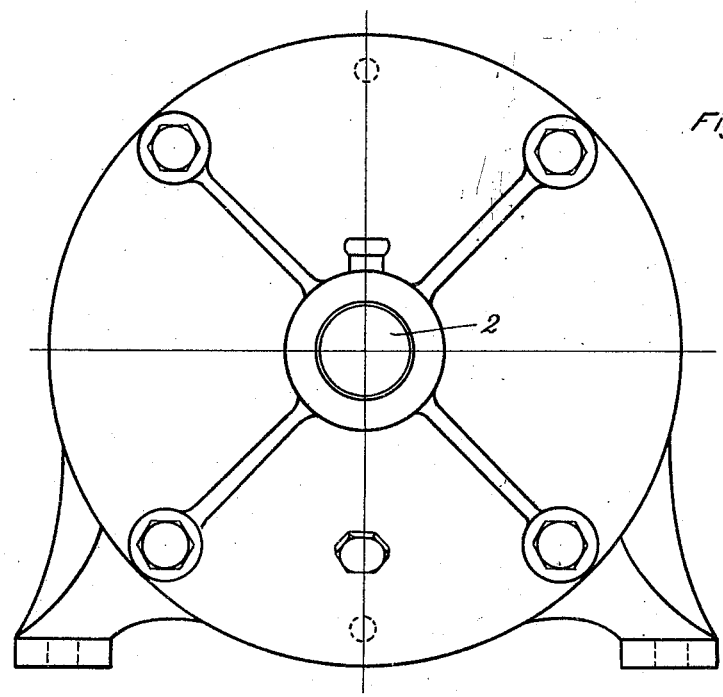
Figure 2 shows an end view of Figure 1.

Referring now to the drawings, Figures 1 and 2; 1 indicates a high speed shaft 2 the low speed shaft. The high speed shaft is fitted with an eccentric sheave 3. This eccentric has mounted thereon a collar or strap 4, which is adapted to receive a radial and rolling action from the eccentric but is allowed to rotate on the said eccentric. The said collar 4 is provided with a ring of teeth 5. The radial and rolling action of the collar 4 is transmitted to the teeth which are moved eccentrically in or out of engagement with the gear wheel 6 which is fixed concentrically with the high speed shaft thus rotating collar 4 at a reduced speed. It will be obvious that the speed of rotation of this gear wheel and consequently the low speed of the shaft 2, to which it is coupled by any suitable flexible coupling 7, in relation to the speed of the high speed shaft 1, will depend upon the number of teeth 5, carried by the eccentric strap 4 in relation to the number of the teeth on the wheel 6. It is obvious that to ensure correct meshing the eccentricity and the pitch circles should be directly related to the number of teeth in each member.

Figure 4:
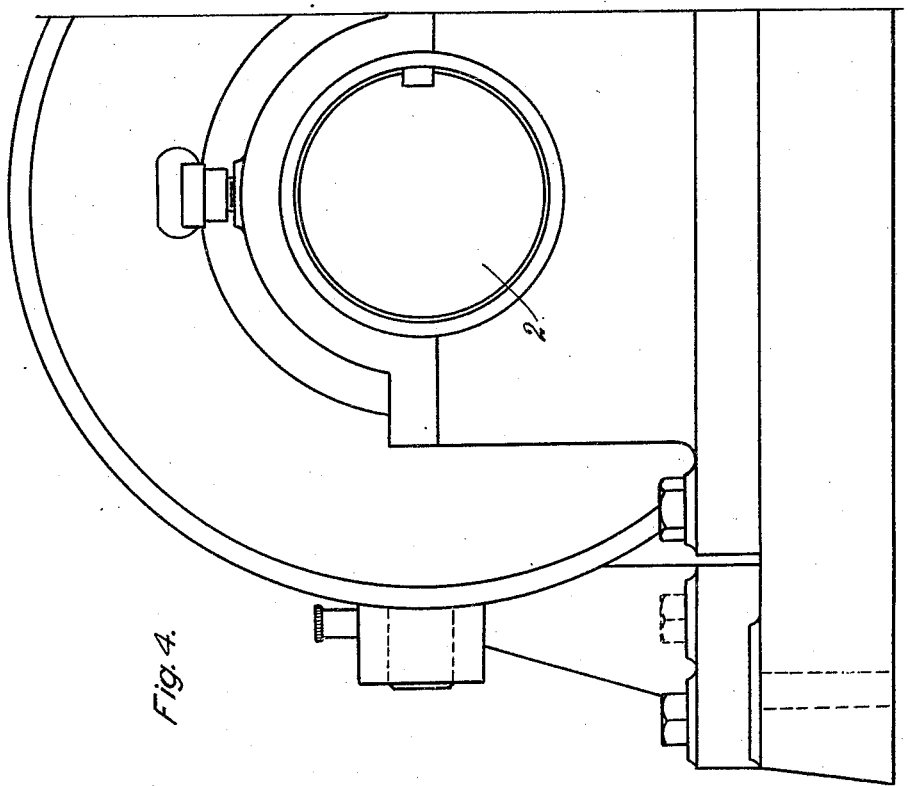
Figure 4 shows an end view of Figure 3, but partly broken away.

In Figures 3 and 4 I show an alternative form of gearing in which, as in Figures 1 and 2; 1 indicates the high speed shaft, 2 the low speed shaft, 3 the eccentric sheave and 4 the collar or strap mounted on the eccentric and adapted to receive a radial and rocking action therefrom and carrying a ring of projecting teeth 5, adapted to be moved in and out of engagement with a gear wheel 6, keyed to the low speed shaft 2. The oscillating strap 4 is prevented from rotating by any suitable flexible coupling 7.

Figure 5:
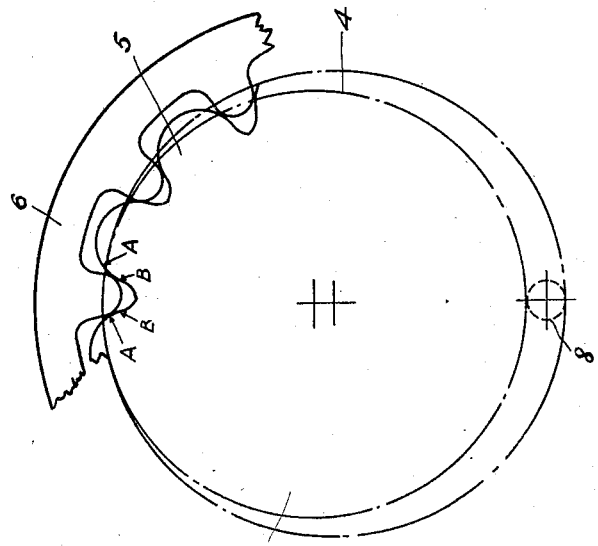
Figure 5 shows one form of teeth in accordance with this invention.

In Figure 5 a cycloidal gearing according to the present invention is illustrated diagrammatically in which those flank portions A—B of the profiles of the teeth 5 of the eccentric strap 4 which come into engagement with the teeth 6 of the concentric member, are of hypocycloidal form. The generating circle of the hypocycloidal portions of the teeth 5 is indicated in Figure 5 by the dot and dash lines 8.

I do not necessarily make the whole of the teeth of either member in the form shown.

The application of the invention is illustrated in the enlarged view in Fig. 6. The pitch circles are indicated by 35 and 36 and 8 is a small circle having a diameter equal to the difference in the diameters of the pitch circles. The teeth 8' in ring 6 are generated by circle 8 as indicated by the dotted outline of this circle applied to the teeth. The teeth 5 in the part 4 are formed by placing two circles 8'' adjacent, equal in diameter to circle 8. The teeth in 5 are completed by rounding off the top in a smooth curve as indicated at 33 and by providing depth to the tooth as indicated at 34.

The important part of the gear teeth is the part which takes the thrust and the wear between the members 4 and 6. The present invention provides an accurate method of determining the curve for this engaging part which, in practice, has proven superior to the methods of the prior art. It will be noted that the pitch circles run together where the teeth are in engagement and that the part of the teeth taking the thrust extends substantially from the pitch circle to a circle passing through the circles 8''. The engaging part of tooth 5 forms the face of band 31 and the engaging part of tooth 6 forms the face of band 32. Line 37, joining the centres of circles 8' and 8'' shows that when the teeth are in full engagement they are in contact between the pitch circle and the circle passing through the centres of 8''. This is the part of the teeth that takes the thrust and the wear and is generated in both sets of teeth by a curve generated by circle 8.

What I claim is:—

1. A reduction gear comprising a driving member, a driven member, a high speed rotating eccentric integral with said driving member, a toothed strap mounted on and adapted to be rocked by said eccentric, a ring of teeth concentric with the axis of rotation of said eccentric adapted to be engaged by said toothed strap and to transmit the motion of said strap to the driven member at a reduced speed, the number of teeth on said strap being fewer than the number of teeth in said ring, the teeth of one of said gear members having the portion of their profiles receiving the main thrust substantially corresponding to a hypocycloidal curve generated by a point in the circumference of a rolling circle with a diameter substantially equal to the difference in the pitch circle diameter of said strap and said ring of teeth.

2. A reduction gear comprising a driving member, a driven member, a high speed rotating eccentric integral with said driving member, a toothed strap mounted on and adapted to be rocked by said eccentric, a ring of teeth concentric with the axis of rotation of said eccentric adapted to be engaged by said toothed strap and to transmit the motion of said strap to the driven member at a reduced speed the number of teeth on said strap being fewer than the number of teeth in said ring, the teeth of the inner member of said gear members having the portion of their profiles receiving the main thrust substantially corresponding to a hypocycloidal curve generated by a point in the circumference of a rolling circle with a diameter substantially equal to the difference in the pitch circle diameters of said strap and said ring of teeth.

3. A reduction gear comprising a driving member, a driven member, a high speed rotating eccentric integral with said driving member, a toothed strap mounted on and adapted to be rocked by said eccentric, a ring of teeth concentric with the axis of rotation of said eccentric adapted to be engaged by said toothed strap, means to transmit the low speed rotation of said strap to the driven member, the teeth on said strap being fewer in number than in said ring of teeth, the teeth on said strap having the engaging portion of their profiles below the pitch circle substantially in the form of the hypocycloidal curve generated by a point on the circumference of a circle with a diameter equal to the difference in the pitch circle diameter of said strap and said ring of teeth rolling inside the pitch circle of said ring of teeth.

In testimony whereof I have signed my name to this specification.

GEORGE WILLIAM CUTLER WEBB.